United States Patent [19]

Takamizawa et al.

[11] 3,927,057

[45] Dec. 16, 1975

[54] METHOD FOR THE PREPARATION OF ORGANOSILYLAMINES

[75] Inventors: Minoru Takamizawa; Toshio Shinohara; Masatoshi Takita, all of Annaka, Japan

[73] Assignee: Shinetsu Chemical Company, Tokyo, Japan

[22] Filed: May 22, 1974

[21] Appl. No.: 472,357

[30] Foreign Application Priority Data

May 29, 1973  Japan.............................. 48-59974

[52] U.S. Cl.................260/448.2 E; 260/448.2 N; 260/448.8 R
[51] Int. Cl.² ....... C07F 7/8; C07F 7/10; C07F 7/18
[58] Field of Search....... 260/448.2 E; 260/448.2 N; 260/448.8 R

[56] References Cited
UNITED STATES PATENTS

| | | | |
|---|---|---|---|
| 3,458,553 | 7/1969 | Niederprüm et al. ........ | 260/448.2 E |
| 3,467,686 | 9/1969 | Creamer...................... | 260/448.2 E |
| 3,481,964 | 12/1969 | Ismail et al................... | 260/448.2 E |
| 3,592,833 | 7/1971 | deMontigny et al......... | 260/448.8 R |
| 3,660,454 | 5/1972 | Gornowicz et al........... | 260/448.8 R |

Primary Examiner—Paul F. Shaver
Attorney, Agent, or Firm—Toren, McGeady and Stanger

[57] ABSTRACT

A triorganohalosilane is reacted with ammonia or amine in a suitable solvent, to produce a reaction mixture of an organosilylamine and an ammonium halide or amine hydrohalide as the byproduct. The byproduct is removed from the reaction mixture by washing with an aqueous alkali hydroxide solution, without a loss of the organosilylamine. Distillation follows and organosilylamine is obtained in very high yields.

14 Claims, No Drawings

METHOD FOR THE PREPARATION OF ORGANOSILYLAMINES

FIELD OF THE INVENTION

The invention relates to a novel method for the preparation of organosilylamines, and in particular to the production of organosilylamines by reacting triorganohalosilanes with ammonia, primary amines or secondary amines.

DESCRIPTION OF THE PRIOR ART

Triorganosilyamines, i.e. mono(triorganosilyl)amines and di(triorganosilyl)amines or 1,3-hexaorganodisilazanes, have been prepared by a reaction represented by the equation;

(I)

or

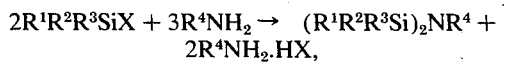

(II)

where $R^1$, $R^2$ and $R^3$ are the same or different kinds of monovalent hydrocarbon groups having 1 to 18 carbon atoms, $R^4$ and $R^5$ are one or two members selected from the group consisting of hydrogen atom and monovalent hydrocarbon groups, and X is a halogen atom such as chlorine or bromine. These reactions necessarily yielded ammonium halides or amine hydrohalides as the byproducts which then had to be removed from the reaction mixtures by some means, such as filtering or centrifugal separation.

In process of the removal of the ammonium or amine salts, considerable amounts of the silylamines were lost due to adsorption by on the salts. Additionally, silylamines were lost during the process of removal of the salts due to the hydrolysis by the atmospheric moisture.

In order to solve the problems described above, a method has recently been proposed by U.S. Pat. No. 3,481,964, wherein the reaction takes place in the upper organic layer above the lower aqueous layer containing a solute such as various salts or alkali hydroxides, the latter layer serving as an extraction phase in situ for separating out the ammonium or amine salts formed in the organic layer. This method can be successfully conducted, to some extent, in a laboratory-scale preparation of the silylamines, while a commercial-scale production according to the method will be hindered by particular difficulties. For example, a large volume of the aqueous layer is required for extracting all of the salts formed in large quantities in the upper layer. Therefore, the reaction vessel is required to have a considerably large capacity for the amount of the silylamines to be produced. In addition, the triorganohalosilane which is added to the upper organic layer has a chance of contacting the lower aqueous layer resulting in the hydrolysis of the silanes and reduced yields of the silylamines. In order to avoid this effect, the addition of the silanes to the organic layer must be carried out with utmost care over a prolonged time. Also, a very large interface area between the layers is essential for the rapid extraction of the salts.

On the other hand, a practice has been to remove water-soluble salts formed in the organic medium by certain organic reactions by washing out with water after the reaction is completed. However, this method is inappropriately applied for the removal of the ammonium or amine salts from the silylamines. Because of the instability of the Si—N bond in the silylamines against the attack of water, especially in acidic conditions, it is readily hydrolyzed to silanols which are then converted into siloxanes by condensation.

Intensive investigations for any advantageous method for the preparation of triorganosilylamines with the above circumstances in mind, resulted a novel method wherein the slurried reaction mixtures composed of the silylamines, the ammonium or amine salts and the solvent after the completion of the reaction, are brought into contact with an aqueous alkali solution of specific concentration, thus making use of the fact confirmed by the inventors that the organosilylamines are relatively stable against aqueous alkali solutions with certain concentrations.

OBJECTS OF THE INVENTION

Accordingly, it is an object of the invention to provide a novel method for the preparation of organosilylamines by reacting triorganohalosilanes with ammonia or amines.

Another object is to provide such a method in which the ammonium or amine salts byproducts in the reaction may be removed without undesirable means as filtering or centrifugal separation.

A further object is to provide such a method in which the removal of the unwanted byproduct is carried out without affecting any substantial loss of the organosilylamine.

SUMMARY OF THE INVENTION

The stability of the organosilylamines against aqueous alkali solutions has been established by the following manner.

Ten grams of N,N-di(trimethylsilyl)amine was added to 20 g each of the alkali solutions shown in Table I. The mixtures were shaken for 5 hours or 24 hours at 20°C and, at the end of each shaking period, the silylamine remaining undecomposed was measured. The results are shown by percentages in the table.

Table I

| Shaking period | Kind of alkali | Concentration of alkali (N) | | | | | | |
|---|---|---|---|---|---|---|---|---|
| | | 0 | 1 | 3 | 5 | 8 | 10 | 12 |
| 5 hrs. | NaOH | 80 | 100 | 100 | 100 | 100 | 100 | 100 |
| 5 hrs. | NH$_4$OH | 80 | 83 | 87 | 91 | 93 | 95 | 95 |
| 24 hrs. | NaOH | 65 | 85 | 94 | 97 | 99 | 99 | 99 |
| 24 hrs. | NH$_4$OH | 65 | 67 | 70 | 72 | 74 | 74 | 74 |

It is found that potassium hydroxide is almost as effective as sodium hydroxide while lithium hydroxide is less effective due to its lower solubility in water, that is to say, its reaching, at the most only 0.6 N. As is clear from the table, the silylamine remains substantially undecomposed by the aqueous alkali solution in a time of, say, 5 hours which is sufficiently long to completely wash out the ammonium or amine salts from the reaction mixture.

The starting triorganohalosilanes employed in the method of the present invention are expressed by the general formula $R^1R^2R^3SiX$, where: $R^1$, $R^2$ and $R^3$ denote the same or different monovalent hydrocarbons having 1 to 18 carbon atoms; and X is a halogen atom. The monovalent hydrocarbons are exemplified by methyl, ethyl, propyl, hexyl, octyl, stearyl, vinyl, allyl, phenyl, benzyl and tolyl groups, which groups are not affected by the alkaline medium. Alternatively, $R^2$ and $R^3$ may be divalent, instead of monovalent hydrocarbon groups froming a single ring structure having the 3 members, $R^2$, $R^3$ and a silicon atom, the ring. Such a ring-formed silane is exemplified by 2-butenylene methyl halosilanes wherein $R^2$ and $R^3$ are —CH$_2$— and —CH=CH—CH$_2$— groups, respectively. The halogen atom in the triorganohalosilanes may be fluorine, chlorine, bromine and iodine atoms. The examples of the triorganohalosilanes are trimethylchlorosilane, dimethylvinylchlorosilane, dimethylphenylchlorosilane, dimethylethylchlorosilane, triphenylchlorosilane, dimethylpropylchlorosilane and 2-butenylene methyl chlorosilane.

Ammonia and the primary and secondary amines to be subjected to the reaction with the above silanes are expressed by the general formula $R^4R^5NH$, where: $R^4$ and $R^5$ are selected from the group consisting of hydrogen atom and monovalent hydrocarbon groups, such as methyl, ethyl, propyl, hexyl, cyclohexyl, octyl and phenyl groups. Several examples of the amines are methylamine, dimethylamine, ethylamine, diethylamine, methylethylamine, propylamine, octylamine and aniline. They are either in a gaseous or liquid state at room temperature.

The reaction of the triorganohalosilanes and ammonia or the amines is carried out, advantageously, in a diluted state with suitable organic solvents. When ammonia or gaseous amines are employed, they are blown into the solution of the triorganohalosilanes to produce the organosilylamine reaction products and the by-product of ammonium halides or amine hydrohalides. When liquid amines are employed, they are added, with or without dilution by organic solvents, to the silane solution, or vice versa.

Although the kind of organic solvent employed is not critical it is, however, preferred that they are inert to the reactants and the aqueous alkali solutions. Examples of such solvents are paraffin hydrocarbons such as n-hexane, cyclohexane, pentane and octane, aromatic hydrocarbons such as benzene, toluene and xylene, and petroleum hydrocarbons such as solvent naphtha, kerosene and organopolysiloxanes having less than 5 of silicone atoms, such as hexamethyldisiloxane. They are also selected with the consideration of their boiling properties, because their clear-cut separation from the silylamine products during the distillation of the reaction mixture, in the final step of the method is essential.

In addition to the above mentioned hydrocarbon solvents, several kinds of low-boiling organopolysiloxanes are useful as the solvent for the reaction medium. Examples of such siloxanes are hexamethyldisiloxane, octamethyltrisiloxane, hexamethylcyclotrisiloxane and phenylpentamethyldisiloxane.

Moreover, organosilylamines, the same as, or different from the organosilylamine to be produced, can be successfully employed as the diluent of the reaction medium. For example, di(trimethylsilyl)amine previously obtained, can be employed as the self-diluent in the preparation of the same compound.

The reaction of the reactants results in a slurried reaction mixture containing ammonium halides or amine hydrohalides. The reaction mixture is then washed with an aqueous alkali solution containing an alkali hydroxide in an amount larger than the stoichiometric amount, dissolving the ammonium or amine salts. The volume of the aqueous alkali solution should be more than enough to dissolve all of the salts. After the salts are completely dissolved, the mixture is kept standing and separates into upper and lower layers. The upper layer is separated from the lower layer and then is subjected to rectification. Thus, the removal of the salts from the reaction mixture is achieved without filtering or centrifugal separation.

The reaction of the afore-mentioned equation (I), wherein 1 mole of the silane reacts with 2 moles of ammonia or the amines, and gives 1 mole each of the monosilylamine and the ammonium or amine salts; whereas the reaction of the equation (II), wherein 2 moles of the silane react with 3 moles of ammonia or the amines, gives 1 mole of the disilylamine (disilazane) and 2 moles of the ammonium or amine salts.

The amount of the alkaline substances employed in the aqueous alkali solution which is brought into contact with the reaction mixture after the reaction, should be greater than 1 mole or 2 moles, respectively, per 1 mole of the monosilylamine or the disilylamine according to the equations (1) or (2), so that they are in excess over the equivalent amounts of the ammonium or amine salts.

The alkaline substances are selected from the group consisting of sodium hydroxide, potassium hydroxide and lithium hydroxide, and preferably from the former two, because of their high solubility and low costs.

The concentration or the volume of the aqueous alkali solution to be employed, should be such that all of the ammonium or amine salts in the slurried reaction mixture are dissolved. Too low a concentration or too large a volume of the alkali solution is contraindicated from the standpoint of productivity. An aqueous alkali solution with low alkali concentration is apt to hydrolyze the silylamine products, resulting in low yields. On the other hand, too high a concentration of alkali, leads to nothing but futile consumption of the alkali hydroxide. Therefore, the concentration of the alkali hydroxide is limited, from a practical standpoint within the range of 2 to 10 N.

In the operation of bringing the reaction mixture and the aqueous alkali solution into contact, it is preferred that the former is added to the latter under agitation. The reverse is also possible, although it results in a lowering of the yield because the hydrolysis of the silylamines may take place by the contact with the aqueous phase deprived of the alkalinity. The upper organic layer separated on standing and the salts separated into the aqueous phase. The upper layer is then subjected to rectification to yield the desired organosilylamines.

By the method of the present invention as described above, mass production of the silylamines is possible since the ammonium or amine salts in the reaction mixture are easily and completely removed from the reaction mixture without the troublesome procedure of filtering or centrifugal separation. This method can also give silylamines of high purity without salt contamination.

The following examples further illustrate the efficacy of the present invention.

EXAMPLES 1 TO 6.

Into a liter flask equipped with a stirrer, a thermometer, a reflux condenser and a gas inlet tube, were put 2 moles each of the triorganohalosilanes as indicated in Table II and 350 g of n-hexane. Into the mixture, 51 g (3 moles) of ammonia gas was introduced through the gas inlet tube, under agitation and at room temperature. The reaction took place readily. After the completion of the reaction, there was added to the reaction mixture, under agitation, 407 g of 6.3N aqueous solution of sodium hydroxide containing 2.05 moles of NaOH. The temperature was maintained at 22°C. After the completion of the dissolution of the ammonium chloride of the slurried reaction mixture into the aqueous phase, the mixture was kept standing. The resulting upper layer was separated from the lower layer and subjected to rectification, to produce corresponding di(triorganosilyl)amines with very high yields as shown in the following table.

Table II

| Ex. No. | Silane | Product | Yield |
|---|---|---|---|
| 1 | $(CH_3)_3SiCl$ | $[(CH_3)_3Si]_2NH$ | 99.7 |
| 2 | $CH_2{=}CH{-}\underset{\underset{CH_3}{\|}}{\overset{\overset{CH_3}{\|}}{Si}}{-}Cl$ | $[CH_2{=}CH{-}\underset{\underset{CH_3}{\|}}{\overset{\overset{CH_3}{\|}}{Si}}{-}]_2NH$ | 99.5 |
| 3 | $C_6H_5{-}\underset{\underset{CH_3}{\|}}{\overset{\overset{CH_3}{\|}}{Si}}{-}Cl$ | $[C_6H_5{-}\underset{\underset{CH_3}{\|}}{\overset{\overset{CH_3}{\|}}{Si}}{-}]_2NH$ | 99.6 |
| 4 | $C_2H_5{-}\underset{\underset{CH_3}{\|}}{\overset{\overset{CH_3}{\|}}{Si}}{-}Cl$ | $[C_2H_5{-}\underset{\underset{CH_3}{\|}}{\overset{\overset{CH_3}{\|}}{Si}}{-}]_2NH$ | 99.5 |
| 5 | $\underset{CH{-}CH_2}{\overset{CH{-}CH_2}{\|\|}}{>}Si{<}\underset{Cl}{CH_3}$ | $[\underset{CH{-}CH_2}{\overset{CH{-}CH_2}{\|\|}}{>}Si{-}CH_3]_2NH$ | 99.5 |
| 6 | $C_3H_7{-}\underset{\underset{CH_3}{\|}}{\overset{\overset{CH_3}{\|}}{Si}}{-}Cl$ | $[C_3H_7{-}\underset{\underset{CH_3}{\|}}{\overset{\overset{CH_3}{\|}}{Si}}{-}]_2NH$ | 99.4 |

EXAMPLES 7 TO 13 AND CONTROLS 1 AND 2

The procedure of Example 1 was substantially repeated with trimethylchlorosilane, except that the solvents, alkali hydroxides, and the concentration and amount of aqueous alkali solutions employed, were as indicated in Tabel III. The resulting di(tri-methylsilyl)amine was obtained with very high yields. A comparative test was carried out with ammonia water as the alkali solution, and a comparative test was carried out with a small amount of a sodium hydroxide solution, resulting in a remarkable low yield. The data and results of these examples and controls are shown in the following table.

Table III

| Example or Control No. | Solvent | Alkali | (N) | Amount (g) | Alkali (moles) | Yield (%) |
|---|---|---|---|---|---|---|
| Example 7 | Benzene | NaOH | 6.3 | 407 | 2.05 | 99.4 |
| Example 8 | $[(CH_3)_3Si]_2NH$ | NaOH | 6.3 | 407 | 2.05 | 99.6 |
| Example 9 | n-Hexane | KOH | 6.3 | 435 | 2.03 | 98.8 |
| Example 10 | n-Hexane | LiOH | 0.57 | 4100 | 2.29 | 99.5 |
| Example 11 | n-Hexane | NaOH | 2 | 1180 | 2.19 | 98.1 |
| Example 12 | n-Hexane | NaOH | 8 | 640 | 3.88 | 99.8 |
| Example 13 | n-Hexane | NaOH | 6.3 | 535 | 2.69 | 99.7 |
| Control 1 | n-Hexane | $NH_4OH$ | 10 | 500 | 3.70 | 51.6 |
| Control 2 | n-Hexane | NaOH | 6.3 | 214 | 1.08 | 37.3 |

EXAMPLES 14 AND 15

The procedure of Example 1 was substantially repeated, except that 4 moles each of methylamine and dimethylamine were employed instead of 51 g of ammonia and the amount of n-hexane was 400 g each instead of 350 g, with the aqueous solutions of sodium hydroxide of 6.3N being used in amounts as indicated in Table IV. The resulting products, trimethylsilylmethylamine and trimethylsilyldimethylamine were obtained with high yields as shown in the following table.

Table IV

| Ex. No. | Amine and its amount (moles) | NaOH solution (g) | Amount of NaOH (moles) | Product | Yield (%) |
|---|---|---|---|---|---|
| 14 | $CH_3NH_2$ (4) | 540 | 2.72 | $(CH_3)_3Si\underset{\underset{}{}}{\overset{\overset{CH_3}{\|}}{N}}H$ | 94.7 |
| 15 | $(CH_3)_2NH$ (4) | 645 | 3.25 | $(CH_3)_3Si\underset{\underset{CH_3}{\|}}{\overset{\overset{CH_3}{\|}}{N}}$ | 87.6 |

EXAMPLES 16 AND 17

The procedure of Examples 14 and 15 was substantially repeated, except that 4 moles of each ethylamine and propylamine diluted with 100 g of n-hexane was added through a dropping funnel into 2 moles of trimethylchlorosilane diluted with 300 g of n-hexane. The amounts of the aqueous solutions of sodium hydroxide of 6.3N used and the amounts of sodium hydroxide contained therein are indicated in Table V. The resulting trimethylsilylethylamine and trimethylsilylpropylamine were obtained with yields as shown in the following table.

Table V

| Ex. No. | Amine and its amount (moles) | NaOH solution (g) | Amount of NaOH (moles) | Product | Yield (%) |
|---|---|---|---|---|---|
| 16 | $C_2H_5NH_2$ (4) | 645 | 3.25 | $(CH_3)_3SiNH-C_2H_5$ | 96.2 |
| 17 | $C_3H_7NH_2$ (4) | 645 | 3.25 | $(CH_3)_3SiNH-C_3H_7$ | 96.0 |

EXAMPLE 18

A procedure similar to Example 1 was repeated, excepting only that hexamethyldisiloxane was used as the solvent instead of n-hexane. The resulting di(trimethylsilyl)amine was obtained with a yield of 99.8%.

What is claimed is:

1. A method for the preparation of organosilylamines which comprises reacting triorganohalosilanes represented by the general formula $R^1R^2R^3SiX$ where; $R^1$, $R^2$ and $R^3$ are the same or different hydrocarbon groups having 1 to 18 carbon atoms, and X is a halogen atom, with a nitrogen-containing compound selected from the group consisting of ammonia and amines represented by the general formula $R^4R^5NH$ where $R^4$ and $R^5$ are selected from the group consisting of hydrogen and monovalent hydrocarbon groups in an inert organic solvent, then after completion of the reaction, contacting the reaction mixture with an aqueous alkali solution containing an alkali hydroxide selected from the group consisting of sodium hydroxide, potassium hydroxide, and lithium hydroxide in an amount in excess of the equivalent amount to the halide salts present in said reaction mixture, dissolving said halide salts in said aqueous alkali solution, and separating said reaction mixture from said aqueous alkali solution.

2. The method as claimed in claim 1 wherein said $R^1$, $R^2$ and $R^3$ are selected from the group consisting of methyl, ethyl, propyl, vinyl and phenyl groups.

3. The method as claimed in claim 1 wherein said $R^1$ is a monovalent hydrocarbon group having 1 to 18 carbon atoms and said $R^2$ and $R^3$ are each divalent hydrocarbon groups with 1 to 4 carbon atoms and taken together form a heterocyclic ring with the silicon atom.

4. The method as claimed in claim 3 wherein said silacyclo compound is 2-butenylene methyl chlorosilane.

5. The method as claimed in claim 1 wherein said $R^4$ and $R^5$ are selected from the group consisting of hydrogen atom and methyl, ethyl, propyl, hexyl, octyl and phenyl groups.

6. The method as claimed in claim 1 wherein said amine is a primary amine.

7. The method as claimed in claim 1 wherein said nitrogen-containing compound is ammonia.

8. The method as claimed in claim 1 wherein said triorganohalosilane is a triorganochlorosilane.

9. The method as claimed in claim 1 wherein said organic solvent is a hydrocarbon solvent.

10. The method as claimed in claim 1 wherein said organic solvent is an organopolysiloxane having less than 5 silicon atoms.

11. The method as claimed in claim 1 wherein said organic solvent is a mono(triorganosilyl)amine.

12. The method as claimed in claim 1 wherein said organic solvent is a di(triorganosilyl)amine.

13. The method as claimed in claim 1 wherein the concentration of said alkali hydroxide in said aqueous alkali solution is within the range between 2 normal and 10 normal.

14. The method as claimed in claim 1 wherein said contact is performed by adding said reaction mixture into said aqueous alkali solution.

* * * * *